United States Patent
Conte et al.

(10) Patent No.: US 8,799,671 B2
(45) Date of Patent: Aug. 5, 2014

(54) TECHNIQUES FOR DETECTING ENCRYPTED DATA

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 804 days.

(21) Appl. No.: 12/436,644

(22) Filed: May 6, 2009

(65) Prior Publication Data

US 2010/0287383 A1 Nov. 11, 2010

(51) Int. Cl.
*G06F 12/14* (2006.01)
*G06F 21/78* (2013.01)
*G06F 21/62* (2013.01)

(52) U.S. Cl.
CPC .......... *G06F 21/78* (2013.01); *G06F 21/6218* (2013.01); *G06F 2221/2107* (2013.01)
USPC .............. 713/189; 713/190; 713/193; 380/28

(58) Field of Classification Search
CPC ................ G06F 21/78; G06F 21/6218; G06F 2221/2107
USPC .............. 380/28; 713/189, 190, 193
See application file for complete search history.

(56) References Cited

U.S. PATENT DOCUMENTS

| | | | |
|---|---|---|---|
| 4,780,905 A | 10/1988 | Cruts et al. | |
| 5,224,166 A | 6/1993 | Hartman, Jr. | |
| 5,386,471 A | 1/1995 | Bianco | |
| 6,249,866 B1 * | 6/2001 | Brundrett et al. | 713/165 |
| 6,832,314 B1 | 12/2004 | Irvin | |
| 6,896,669 B2 | 5/2005 | Krautkramer | |
| 6,948,033 B2 | 9/2005 | Ninose et al. | |
| 7,111,169 B2 | 9/2006 | Ripley et al. | |
| 7,181,572 B2 | 2/2007 | Walmsley | |
| 7,305,562 B1 | 12/2007 | Bianco et al. | |
| 7,337,328 B2 | 2/2008 | Evans | |
| 7,434,255 B2 | 10/2008 | Akimoto | |
| 7,613,920 B2 | 11/2009 | Gustave et al. | |
| 7,627,756 B2 | 12/2009 | Fujibayashi et al. | |

(Continued)

FOREIGN PATENT DOCUMENTS

| | | |
|---|---|---|
| KR | 1020060102584 | 9/2006 |
| KR | 1020090019402 A | 2/2009 |

(Continued)

OTHER PUBLICATIONS

Shannon, , "A Mathematical Theory of Communication", Bell System Technical Journal, vol. 27, Jul., Oct. 1948, pp. 379-423, 623-656.

*Primary Examiner* — Yin-Chen Shaw
(74) *Attorney, Agent, or Firm* — Dorsey & Whitney LLP (57) ABSTRACT

Techniques are described that generally relate to methods for detecting encryption status of a data file or data stream and selectively encrypting the data file or data stream based on the encryption status of the data file or data stream are generally disclosed. Example methods may include one or more of reading the data file or data stream from a data source, calculating a value of a property of the data file or data stream, comparing the calculated value with a threshold value to determine whether the file is encrypted or unencrypted, and encrypting files that are determined to be unencrypted.

26 Claims, 8 Drawing Sheets

(56) References Cited

U.S. PATENT DOCUMENTS

| | | |
|---|---|---|
| 7,647,452 B1 | 1/2010 | Moll et al. |
| 7,881,471 B2 * | 2/2011 | Spohrer et al. ............... 380/257 |
| 8,181,047 B2 | 5/2012 | Lee |
| 8,213,607 B2 | 7/2012 | Rose et al. |
| 8,341,724 B1 | 12/2012 | Burns et al. |
| 8,352,679 B2 | 1/2013 | Wolfe et al. |
| 2003/0005314 A1 | 1/2003 | Gammel et al. |
| 2003/0028699 A1 | 2/2003 | Holtzman et al. |
| 2003/0145329 A1 | 7/2003 | Candelore |
| 2003/0177386 A1 | 9/2003 | Cuomo et al. |
| 2004/0236884 A1 * | 11/2004 | Beetz ............................. 710/68 |
| 2006/0080553 A1 | 4/2006 | Hall |
| 2006/0129811 A1 | 6/2006 | Fiske |
| 2006/0195704 A1 | 8/2006 | Cochran et al. |
| 2006/0230234 A1 | 10/2006 | Bentolila et al. |
| 2007/0038858 A1 * | 2/2007 | Hughes ........................ 713/168 |
| 2007/0055893 A1 | 3/2007 | Dodd |
| 2007/0101124 A1 | 5/2007 | Pitts |
| 2007/0116267 A1 * | 5/2007 | Speirs et al. .................... 380/28 |
| 2007/0136606 A1 * | 6/2007 | Mizuno ........................ 713/189 |
| 2007/0180239 A1 | 8/2007 | Fujibayashi et al. |
| 2007/0245160 A1 | 10/2007 | Benhase et al. |
| 2008/0017712 A1 | 1/2008 | Hart et al. |
| 2008/0040710 A1 | 2/2008 | Chiriac |
| 2008/0208755 A1 | 8/2008 | Malcolm |
| 2008/0229118 A1 | 9/2008 | Naohisa et al. |
| 2008/0232592 A1 * | 9/2008 | Lee et al. ....................... 380/277 |
| 2009/0119242 A1 * | 5/2009 | Vargas Martin ................ 706/48 |
| 2009/0144546 A1 | 6/2009 | Jancula et al. |
| 2010/0031062 A1 * | 2/2010 | Nishihara et al. ............. 713/193 |
| 2010/0042832 A1 | 2/2010 | Fujibayashi et al. |
| 2010/0169683 A1 | 7/2010 | Wang et al. |
| 2010/0281223 A1 | 11/2010 | Wolfe et al. |
| 2010/0281247 A1 | 11/2010 | Wolfe et al. |
| 2010/0287385 A1 | 11/2010 | Conte et al. |

FOREIGN PATENT DOCUMENTS

| | | |
|---|---|---|
| WO | 2008/044837 A1 | 4/2008 |
| WO | 2010/127008 | 11/2010 |
| WO | 2010/127030 | 11/2010 |

* cited by examiner

| Types of Unencrypted Data | Example File Extensions | Likely Encrypted? |
|---|---|---|
| Text Files | .txt, .doc, .wpd | No |
| Compressed data | .r.r, .zip, .lhz, .7z, .ios, .img | — |
| Other | .jpg, .gif, .tif, .wav | No |

TECHNIQUES FOR DETECTING ENCRYPTED DATA

CROSS REFERENCE TO RELATED APPLICATION

This application incorporates by reference related application Ser. No. 12/436,657, filed May 6, 2009, and titled "Securing Data Caches Through Encryption" in its entirety.

BACKGROUND

Stored and transmitted electronic data is often encrypted for data security purposes. There are a multitude of different encryption methods, usually involving transforming data files or data streams using an encryption algorithm. The encrypted data can be decrypted only by the appropriate decryption key and/or algorithm, generally available only to authorized users. Encryption methods may have the ability to recognize data that the encryption method itself has already encrypted. This avoids the inefficiencies inherent in double-encrypting such data, and at the same time avoids mistakenly attempting to decrypt either unencrypted data or data encrypted using a different protocol, which can result in unrecoverable, nonsense data. Encryption methods usually recognize encrypted data files or data streams they have themselves encrypted through a simple tag (such as a file extension) or code embedded within the data.

While many encryption methods are capable of detecting data the method itself has encrypted, it is useful to be able to detect encrypted data encrypted by any method, i.e., detecting encryption generally.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly and implicitly contemplated and made part of this disclosure.

This disclosure is drawn, inter alia, to methods, apparatus, computer programs and systems related to detecting encrypted and unencrypted data. Embodiments provided therein may be useful to make data encryption/decryption processes more efficient. Throughout, unencrypted data is intended to refer to data that has never been encrypted and also to refer to data that has been encrypted and decrypted so long as it is now not in an encrypted state. The encryption status of the data is intended to refer to whether the data is encrypted or unencrypted. Throughout, the term "data file" is intended to be inclusive of data streams, such as partial data files and/or data in transmission between the CPU, main memory, bulk storage devices, network storage devices and the like. In various examples, hardware and software systems and methods are disclosed. There are various vehicles by which processes and/or systems and/or other technologies described herein can be effected (e.g., hardware, software, and/or firmware), and that the vehicle used in any given embodiment may vary within the context in which the processes and/or systems and/or other technologies are deployed.

Self-identification codes, which a encryption method uses to recognize data that it itself has encrypted, may in some examples be used to detect encrypted data. In addition, data encrypted by sophisticated encryption methods tends to have a more uniform distribution than unencrypted data. Data encrypted using simple encryption methods tends to mirror unencrypted data in that the frequency distribution of data values of each data byte (the equivalent to a single letter in a text document) in the data as a whole is highly ordered and predictive of future values. Since this information can be used to break an encryption code, sophisticated encryption methods tend to reduce or "randomize" the internal structure of data, making the frequencies and order of data bytes less predictable and thus, less vulnerable to being broken by brute-force frequency analysis codebreaking methods.

Thus, most encrypted data tends to have a characteristic, uniform distribution of data values. Since compressed data, i.e., data transformed to take up less space in computer memory or data storage, has a similarly uniform distribution of data values, a method of distinguishing between compressed and encrypted data is also useful.

Figure 1:
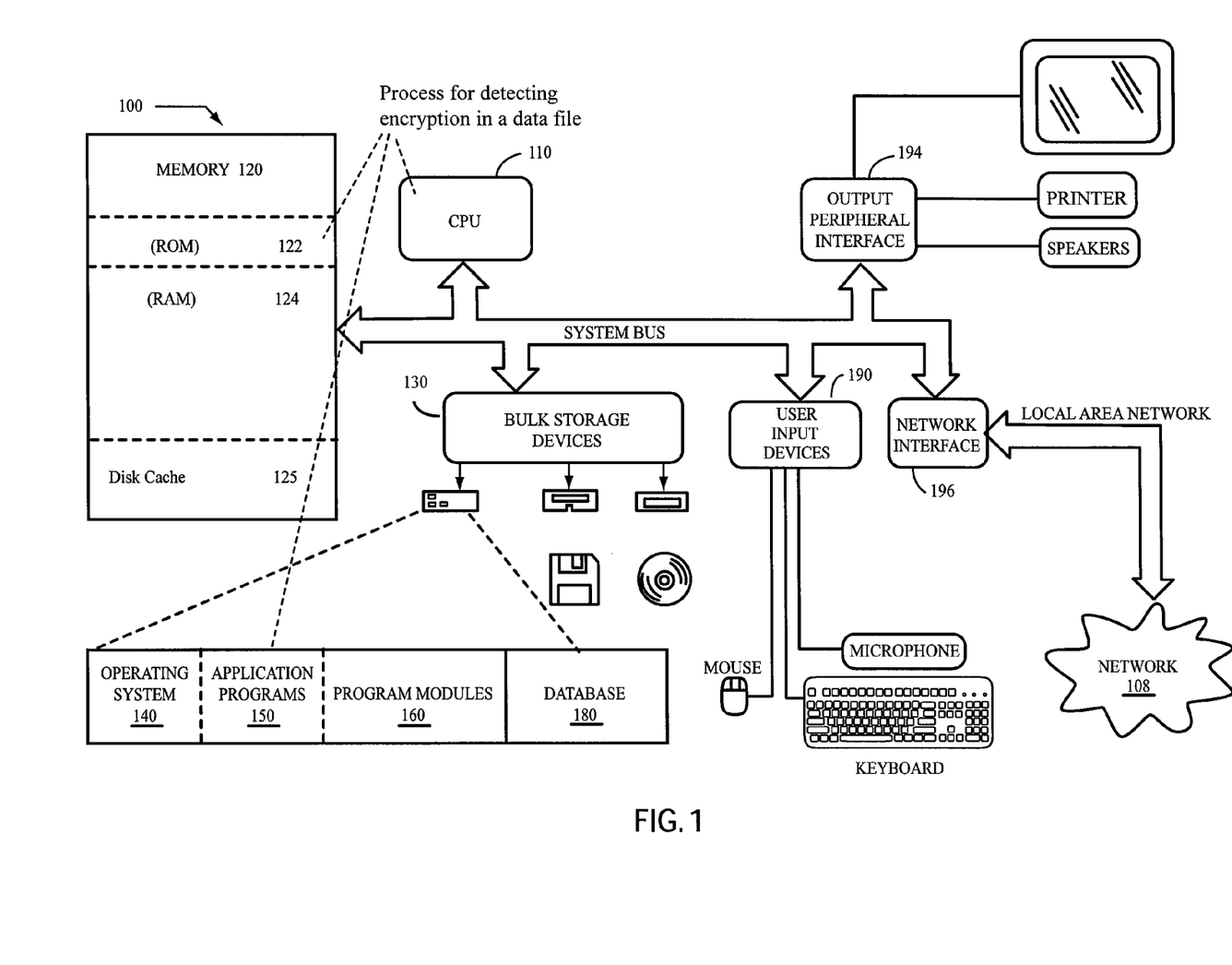
FIG. 1 is a schematic of a computer system capable of running the encryption detection process of the present disclosure.

FIG. 1 is a schematic of a computer system capable of running the encryption detection process of the present disclosure. FIG. 1 includes a computer 100, including a CPU 110, main memory 120 and one or more bulk storage devices 130. The processor 110 can generally be of any desired configuration including but not limited to a microprocessor (µP), a microcontroller (µC), a digital signal processor (DSP), or any combination thereof. Thus, each processor 110 can include logic for executing program instructions as well as other functional blocks such as an arithmetic logic unit (ALU), a floating point unit (FPU), a digital signal processing (DSP) core, registers, accumulators, etc. The main memory 120, which may be any suitable form of memory including, but not limited to, volatile memory such as random access memory (RAM) 124, non-volatile memory such as read only memory (ROM) 120, and flash memory storage, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile. The main memory 120, may contain in RAM 124 a disk cache 125, in which frequently accessed data from bulk storage devices 130 is stored during computer operation. The bulk storage devices 130 and their associated computer storage media, provide storage of computer readable instructions, data structures, program modules and other data for the computer 100. Bulk storage devices 130 can include an operating system 140, application programs 150, program modules 160, and database 180. The computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196. The remote computer may be a personal computer, a server, a router, a network PC, a peer device or other common network node, and can include many or all of the elements described above, such as bulk storage devices, relative to computer 100. Networking environments are commonplace in offices, enterprise-wide area networks (WAN), local area networks (LAN), intranets and the Internet. For example, in the subject matter of the present application, the remote computer and/or bulk storage device connected to the remote computer may comprise source data of the data in the disk cache 125. Source and destination machines need not be connected by a network 108 or any other means, but instead, data may be migrated via any media capable of being written by the source platform and read by the destination platform or platforms. When used in a LAN or WAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

The process for detecting encrypted data may, for example, be loaded into the computer main memory ROM 122 and/or RAM 124 via an application program 150 stored on a bulk storage device 130. The process may operate by subroutines loaded into and run by the CPU 110. Further detail of an example embodiment running on an example device will be described later with reference to FIG. 7.

Figure 2:
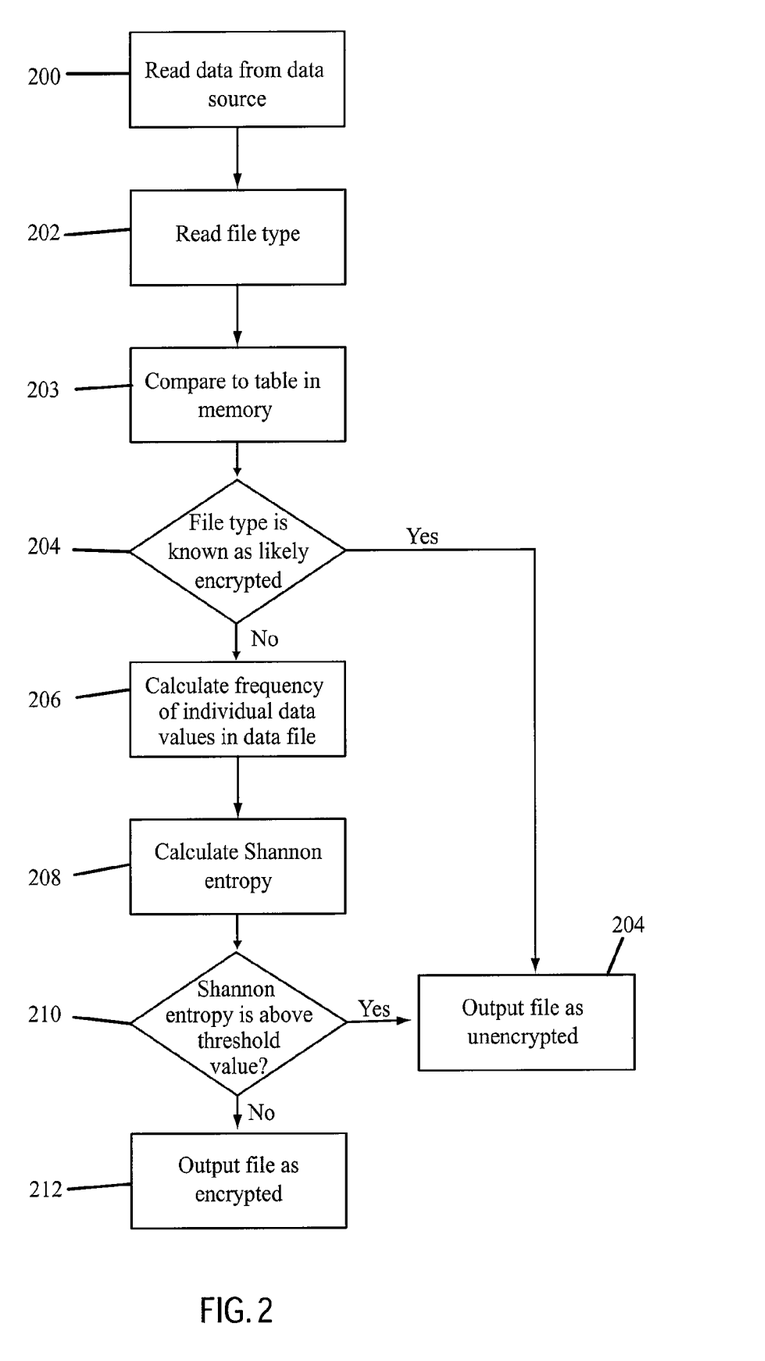
FIG. 2 is an flowchart of an illustrative embodiment of the encryption detection process of the present disclosure.

FIG. 2 is an flowchart of an illustrative embodiment of the encryption detection process of the present disclosure. The process begins by reading data from data storage into system memory (block 200). Alternatively, the data to be processed may be stored in, and read from, another area of system memory, for instance in the disk cache, or in a data storage drive such as a hard disk or smart drive, possibly accessed remotely on a network.

Next the process may determine the type of data file(s) that is (are) being read (block 202). For example, in the Windows operating system, one way to do so may be to read the file extension. Certain kinds of files, such as files with a .doc or .txt extension are likely to be unencrypted. Typical file extensions that indicate text or other unencrypted data can be stored, for example, in a table in memory and compared with a file extension of a particular file (block 203). If a file is of the target type, then it may be flagged as unencrypted (block 204). The operations shown in blocks 202-204 are an example of a quick sorting method, and may, in some cases, be over-inclusive (because any encrypted files with the target extension or file signature would be marked as unencrypted). Note that the over-inclusion error would be toward greater security (more files are marked as unencrypted, and thus needing encryption), but if a particular application needed greater precision, blocks 202-204 could be omitted in an alternative method, or a different method of detecting file types used.

Next the process may calculate the frequency of occurrence of each individual data value in the file (block 206). This frequency data is used to calculate the Shannon entropy of the data (block 208). The Shannon entropy is a measure of the amount of order in data. C. E. Shannon, "A Mathematical Theory of Communication", Bell System Technical Journal, vol. 27, pp. 379-423, 623-656, July, October, 1948. Where p is the probability mass function of data with values ranging between $\{x_1 \ldots x_i\}$, the entropy H(X) is defined as $$H(X) = -\sum_{i=1}^{n} p(x_i) \log_b p(x_i).$$

Usually, b may be set at 2 in the context of electronic, binary data, giving an entropy value with units in "bits." The value of the Shannon entropy of the data is lower when the data is more predictable. Higher values are thus associated with encrypted data.

Other calculations derived from the frequency data calculated in block 204 are possible as well. One example may be to examine the frequency data for characteristic frequency structures such as those an unencrypted text file may have. Text data files are dominated by relatively few data values, such as the numeric values corresponding to or coding for letters, numbers and other frequently used symbols. A statistical test as to Whether the frequency profile differs from a typical text file or a simple query as to whether certain possible values in the data are missing may be able to indicate whether a file is an unencrypted text file.

Next the Shannon entropy value may be compared to a predetermined threshold value (block 210). If the Shannon entropy value is above (or exceeds) the predetermined threshold, then the routine will output that the data file is encrypted (block 212). If the entropy value is below (or fails to exceed) the predetermined threshold, the process will output that the data file is unencrypted (block 214). Such output could be used in several applications, such as in a data encryption program to ensure that all data is encrypted once. While specific description is made herein to detect encryption using Shannon entropy calculations, it is to be appreciated that other methods for detecting encryption may alternatively be used. Data to be read and further processed may be read substantially simultaneously and processed as one large block, or read and processed in smaller units, such as data blocks, or individual files. If the data is read and processed in parts, then the method in FIG. 2 may be repeated for each part until all of the data is read or the process is otherwise ended.

Figure 3:
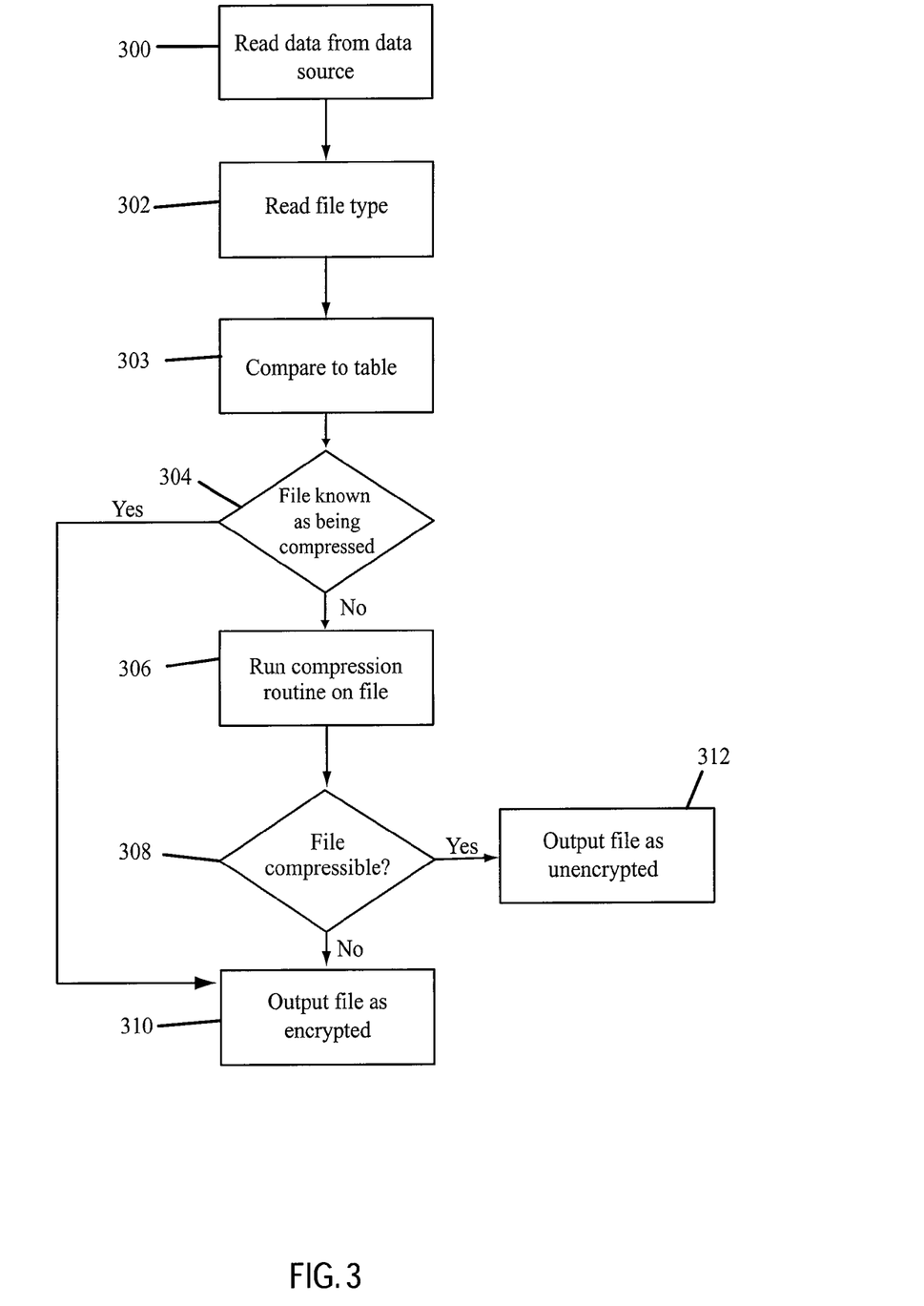
FIG. 3 is a flowchart of an illustrative embodiment of the encryption detection process using a compression detection process in accordance with the present disclosure.

FIG. 3 is a flowchart of an illustrative embodiment of the encryption detection process using a compression detection process in accordance with the present disclosure. The process begins by reading data from data storage into system memory (block 300). Alternatively, the data to be processed may be stored in and retrieved from another area of system memory, for instance in the disk cache, or in a data storage drive, such as a hard disk or smart drive, possibly accessed remotely on a network.

Compressed files have similar information entropy values as encrypted files because compression algorithms, such as Lempel-Ziv-Welch (LZW), strip data redundancy from a file, thus lowering the frequencies of redundant data values. Compressed files may or may not be encrypted. Accordingly, in methods involving determining whether a file is encrypted, a further process, shown in FIG. 3, may be undertaken to remove compressed files from consideration. The process begins by reading data from data storage into system memory (block 300). The process may next determine the type of data file(s) that is (are) being read (block 302). This determined type may be compared, for example, to a table of file extensions (block 303). The table of file extensions may include file extensions such as zip or .rar that indicate compressed files. Thus, the example in FIG. 3 flags compressed files as unencrypted (block 304). As discussed with respect to FIG. 2, the file extension data can also be used as an initial sorting mechanism for text or other data that is likely to be unencrypted.

Next, the process may run a compression routine on any data files that have not been already flagged as unencrypted (block 306). The file may be compressed by a quick compression protocol, such as gzip, and the compressibility of the data file assessed. One potential method to assess compressibility may be to compare the difference in file size between the compressed and non-compressed file. If the difference is large and above a certain threshold, the original file may be flagged as compressible (block 308). Compressible files are likely to have not been encrypted, and are flagged and/or output as unencrypted (block 312). Otherwise, the file is flagged and/or output as encrypted (block 310).

Figure 4:
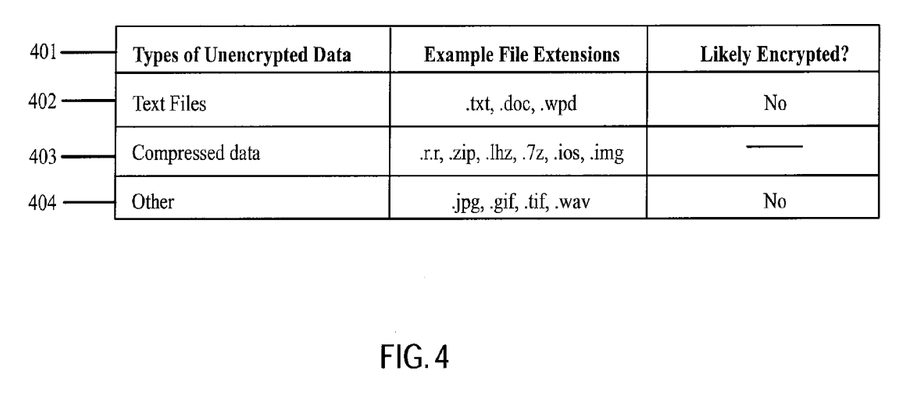
FIG. 4 is a chart of example file extensions that the process may recognize as unencrypted or encrypted.

FIG. 4 is a chart of example file extensions that the process may recognize as unencrypted or encrypted. The table 401 lists several types of data, their example file extensions, and whether they are likely to be unencrypted. Extensions for text files, which are likely to be unencrypted, are listed at row 402. Compressed data extensions are listed at row 403. Finally, other file extensions for data files containing data such as picture data (for example, .jpg), and sound data (e.g., .wav), which are both likely to be unencrypted, are listed at row 404.

Figure 5:
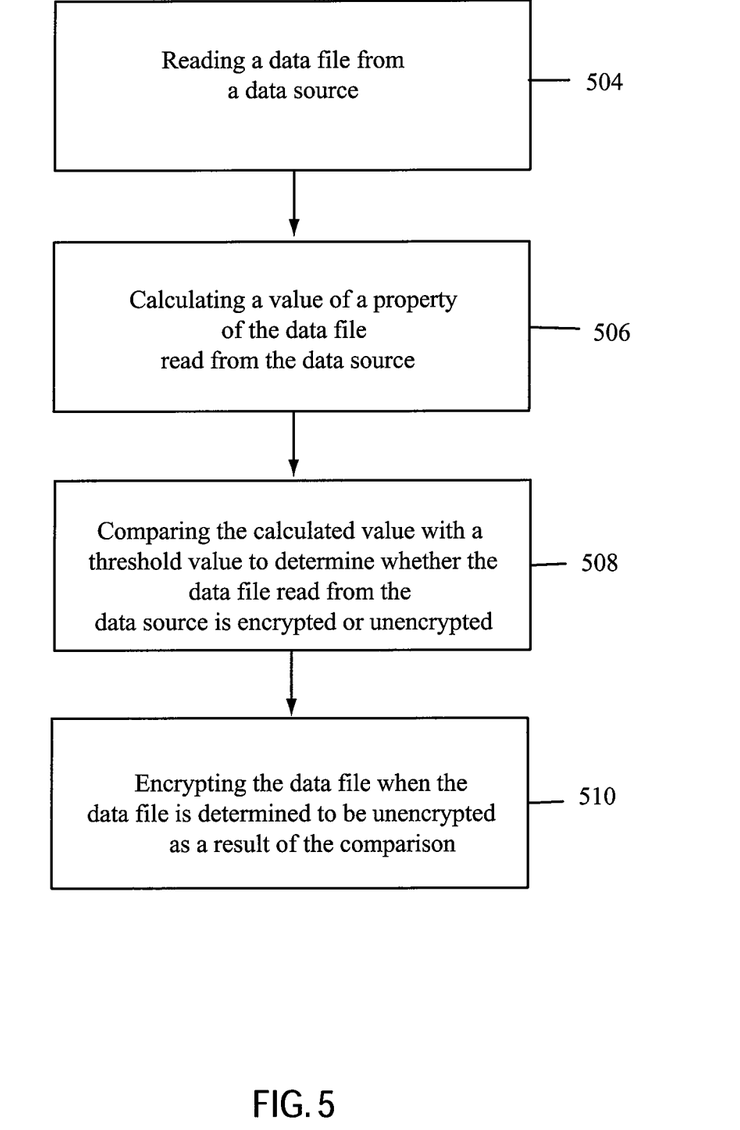
FIG. 5 is a flow chart of a method for detecting encrypted data according to an illustrative embodiment of the present disclosure.

FIG. 5 is a flow chart of a method for detecting encrypted data according to an illustrative embodiment of the present disclosure. The method may include reading a data file from a data source (block 504). The method may also include calculating a property of the data file read from the data source (block 506). The method may further include comparing the calculated value with a threshold value to determine whether the data file read from the data source is encrypted or unencrypted (block 508). The method may also include encrypting the data file read from the data source when the data file is determined to be unencrypted as a result of the comparison (block 510).

Figure 6:
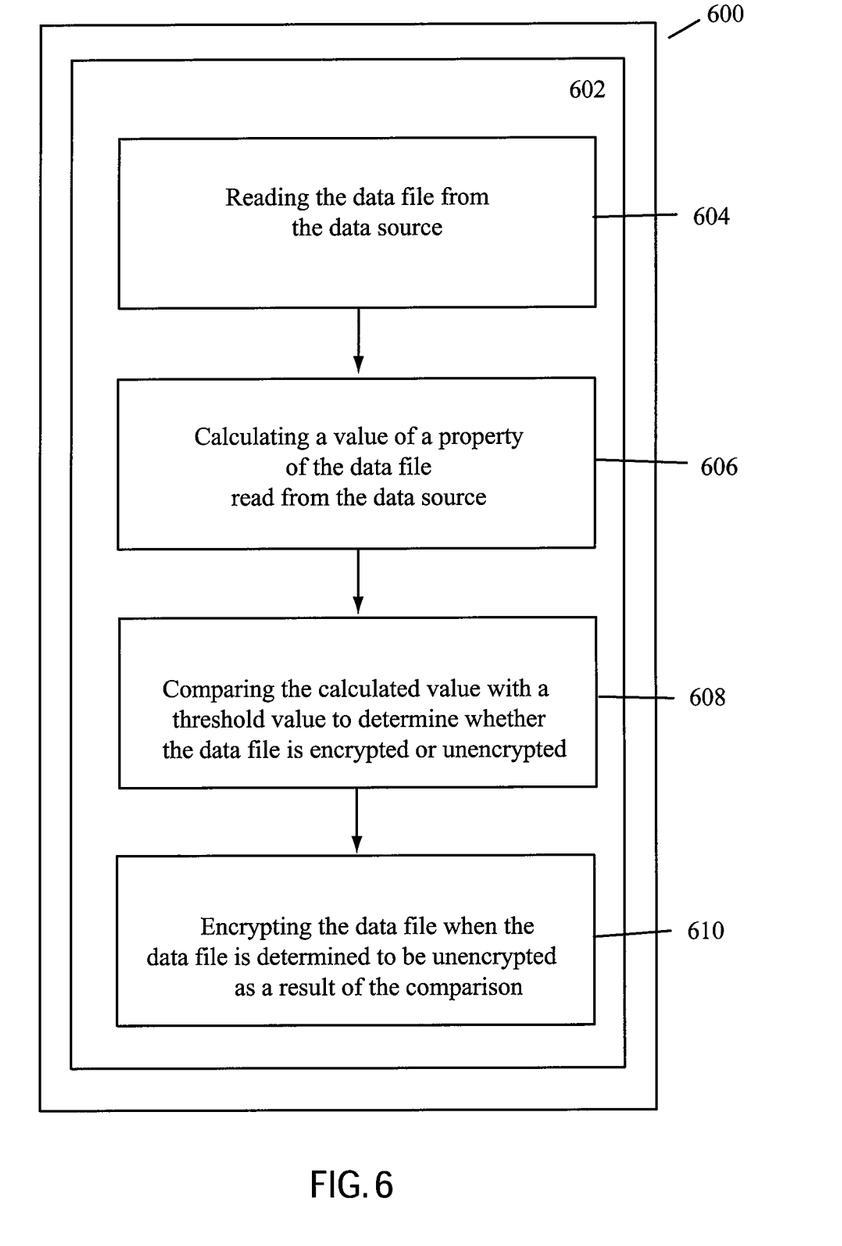
FIG. 6 is a schematic of a system for performing detecting encrypted data according to an illustrative embodiment of the present disclosure.

FIG. 6 is a schematic of a system for performing detecting encrypted data according to an illustrative embodiment of the present disclosure. In some examples a computer system 600 may include a processor 602 configured for performing a process that detects encryption status of a data file in a data source and selectively encrypts the data file based on the encryption status of the data file. In block 604, the method may include reading the data file from the data source. In block 606, the method may include calculating a property of the data file read from the data source. In block 608, the method may include comparing the calculated value with a threshold value to determine whether the data file is encrypted or unencrypted. In block 610, the method may include encrypting the data file read from the data source when the data file read from the data source is determined to be unencrypted as a result of the comparison.

Figure 7:
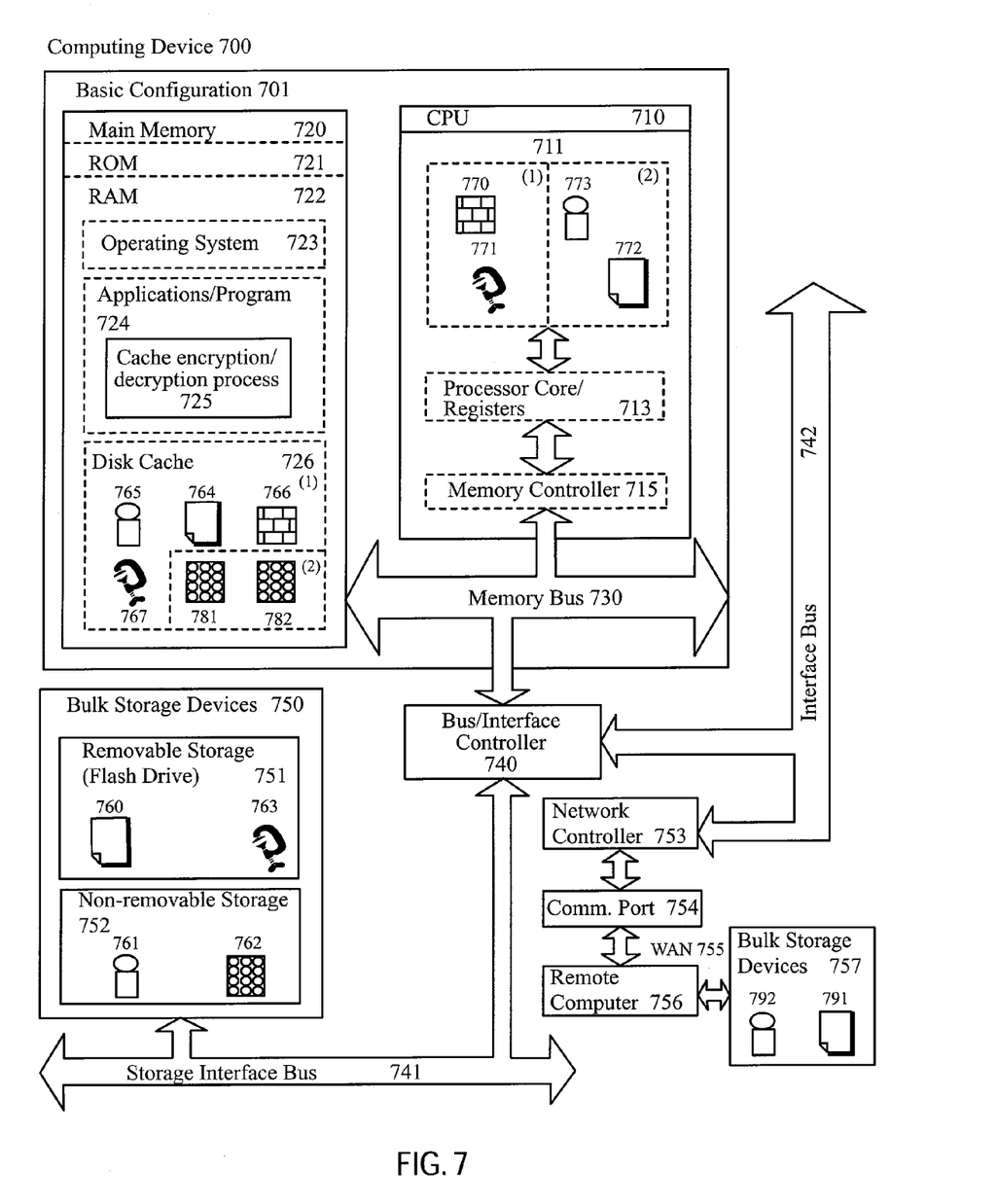
FIG. 7 is a diagram of an example method of encryption detection as may be performed in a illustrative computing device arranged in accordance with the present disclosure.

FIG. 7 is a diagram of an example method of encryption detection as may be performed in a illustrative computing device arranged in accordance with the present disclosure. The computing device 700 contains a basic configuration of a data processor 701. The data processor 701 contains a CPU 710, which may include: a CPU cache 711 arranged to temporarily store frequently accessed data (often from main memory 720) to speed data processing operations, the processor core and registers 713, and a memory controller 715. Main memory 720 may include one or more of a ROM 721 and a RAM 722. The RAM 722 may be arranged to store the computer's operating system 723, as well as application programs and program data 724. In this example system, the encryption detection instructions 725 are illustrated as stored in RAM 722 as application program 724, but in alternative embodiments the encryption detection instructions 725 may be stored elsewhere (e.g., ROM 721). A disk cache 726 may also be stored in RAM 722.

Main memory 720 and the CPU 710 may communicate via a memory bus 730. The basic configuration of data processor 701 may communicate with external components via a bus/interface controller 740. The bus/interface controller 740 may further communicate to external components either via a storage interface bus 741 or another interface bus 742. The storage interface bus 741 may communicate with bulk storage devices 750. Bulk storage devices 750 may include removable storage 751, (e.g., a flash drive), and non-removable storage 752 (e.g., a hard disk drive or HDD) devices. The interface bus 742 may communicate with other external peripherals such as a network controller 753, or a monitor, printer, pointing device, etc. (not shown here for clarity). The network controller 753 may be arranged to allow the computing device 700 to communicate with a remote computer 756 (e.g., a server, or some other remote computing device) via a network (e.g., WAN 755) through a communications port 754. One or more remote bulk storage devices 757 may be coupled to the remote computing device 756.

The disk encryption detection process may begin with the encryption detection instructions 725 being read and executed by the CPU 710. The process may first read one or more data files from a data source. For example, some data files may be stored in removable 751 or non-removable 752 bulk storage devices 750. Example data files may include a text file 760, a picture file 761, an encrypted file 762 and a compressed file 763. The process may be arranged to detect encryption directly on the bulk storage device 750. For this example, however, the process may be described as operating on copies of the data files stored in the disk cache, 726. Data files stored in the disk cache 726 may correspond to those data files that the CPU 710 may access frequently and/or most recently (perhaps they are being actively edited by the user). The copied files, 764, 765, 766, and 767, are shown in the disk cache 726 at state (1).

The encryption detection process reads the disk cache contents, 726 state (1). First, the file type of files 764-767 may be identified. Examples of mechanisms that identify the file type may include reading the file extensions, information encoded in the file, and/or metadata associated with the file. The process may recognize data files 764 and 765 as being file types (text files and picture files, respectively) that are likely to be unencrypted. Data files 764 and 765 may be marked as unencrypted (their status stored in a table kept in memory 722, for instance). The process may recognize file 767 as a compressed file type. The file type of 766 may be unrecognized. Next, at least a portion of data files 766 and 767 may be evaluated by the CPU 710 for encryption detection. This is shown on the diagram as all or a portion of data files 764 and 765 are read into the CPU cache and stored therein as data files 770 and 771 during processing.

The encryption process, in this example, may first decompress data file 771. Then, the frequency of occurrence of the various data values in each data file, 770, 771, may be computed, and the Shannon entropy of each data file may be calculated. Both files may be discovered to be encrypted. Thus, the process may discover that data file 771 was a compressed, encrypted file, and may therefore avoid double encrypting the file. Both data files may be marked as encrypted (via a table kept in memory 722, for instance).

The unencrypted text file 764 and picture file 765 can then be encrypted by the process. Both data files 764 and 765 may be read into the CPU 710. This is shown on the diagram as files 764 and 765 are stored in the CPU cache, 711 state (2), as files 772 and 773, prior to encryption by some other process. After encryption, the files 781 and 782 may be stored back in the disk cache, 726 state (2).

In some alternative examples, the encryption detection process may use data files 791 and 792, whose ultimate source may be a remote network storage drive 757. In these examples, encryption may be detected directly on the files in the remote storage 757, or when the files are read and cached in one of the bulk storage devices 750 or in the disk cache 726 of the computing device 700.

Figure 8:
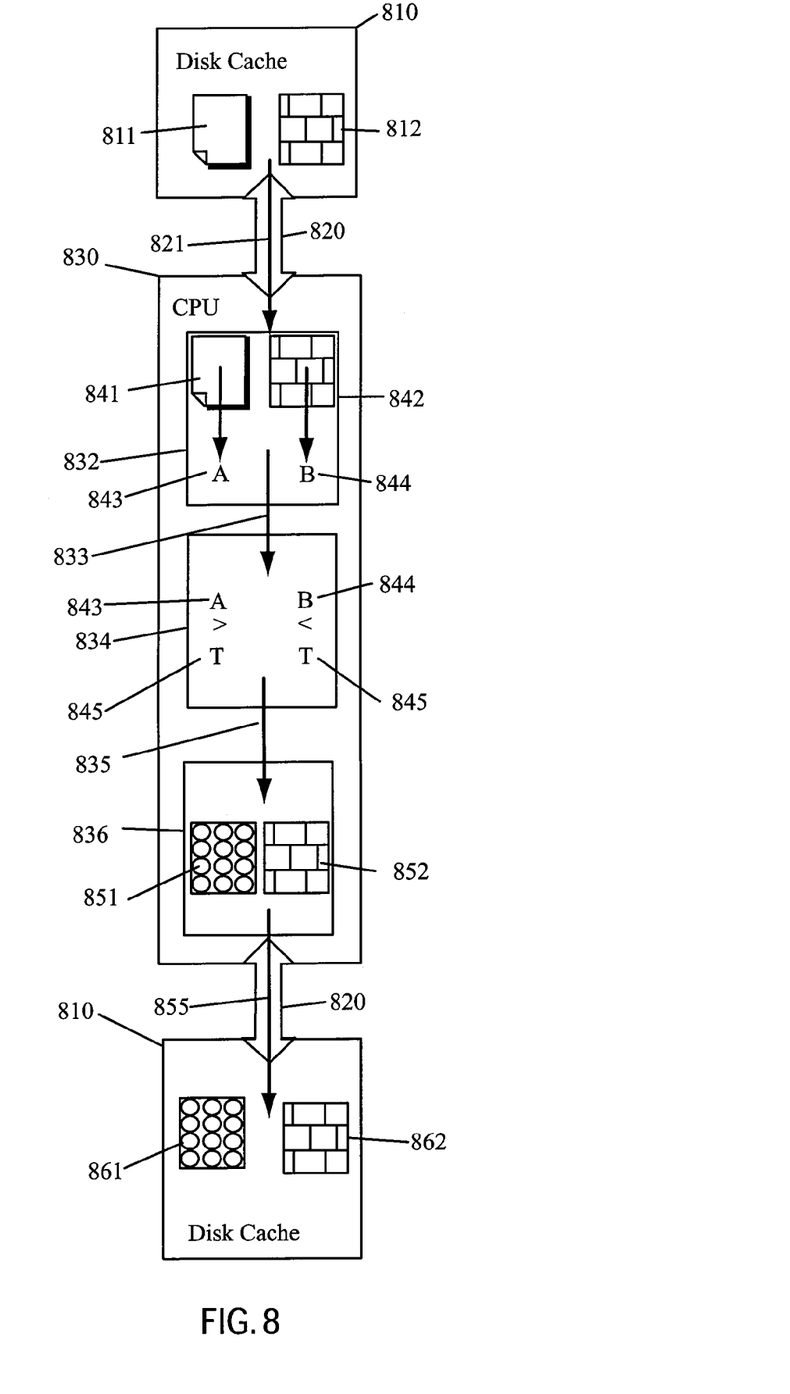
FIG. 8 is a diagram of an example method detailing the encryption detection process in a disk cache and central processing unit (CPU) arranged in accordance with the present disclosure.

FIG. 8 is a diagram of an example method detailing the encryption detection process in the disk cache and central processing unit (CPU) arranged in accordance with the present disclosure. Two example data files, a unencrypted text file 811, and a previously encrypted file 812 may be stored in a disk cache 810 in an example computing system. The disk cache 810 may be arranged to communicate via a memory bus 820 with a CPU 830. In FIG. 8, the processing for CPU 830 may be in several different operating or computational states as illustrated by blocks 832, 834, and 836.

The cache encryption process may begin when the CPU 830 reads (arrow 821) the files 811, 812 from the disk cache (or data source) 810 into the CPU 830 through the memory bus 820. Next, the CPU 830 may be arranged to calculate one or more properties (843, 844) for the unencrypted text file 841 and already encrypted file 842 as illustrated by values A and B in block 832. Properties 843 and 844 may include, for example, each data file's respective Shannon entropy. Next, the CPU 830 may be arranged to compare the calculated values 843, 844 with a threshold value 845 as illustrated in block 834. Here, for example, the calculated value 843 may be larger than the threshold (e.g., T) 845, i.e., A>T, which may indicate an unencrypted file. The calculated value 844 may be smaller than the threshold 845, i.e., A<T, which may indicate an encrypted file. In response, the CPU 830 may encrypt the unencrypted text file 851, and may leave the already encrypted file 852 unchanged as illustrated in block 836. The encrypted files 861, 862 may then be written 855 through the memory bus 820 back into the disk cache 810.

The foregoing describes various examples of data encryption detection. Following are specific examples of methods and systems of data encryption detection. These are for illustration only and are not intended to be limiting. The present disclosure generally relates to a method for detecting an encryption status of a data file and selectively encrypting the data file based on the encryption status of the data file. The described method typically includes reading the data file from a data source, calculating a value of a property of the data file, comparing the calculated value with a threshold value to determine whether the file is encrypted, and selectively encrypting those files that are determined as being unencrypted.

In some further described methods, the method may include calculating, as the calculated value for a property of the data file, frequencies of occurrence of a plurality of values in the data file, measuring the uniformity of the calculated frequencies, and comparing the calculated uniformity measure to a threshold value. In some described examples, the Shannon entropy of the frequencies of occurrence is calculated as a measure of the uniformity. In some described examples, a distribution of the frequencies of occurrence of a plurality of values in the read data file may be calculated, and compared with the distribution of the frequencies of occurrence to an average distribution for at least one reference distribution, and a determination made whether the distribution of the frequencies of occurrence differs significantly from the at least one reference distribution. The described methods may further use as a reference distribution the distribution of frequencies of a predetermined file type. In some examples the predetermined file type may be a text file. In some examples, data files on which the frequency of occurrence is calculated may be selected from the data source by determining the file types of the data files on the data source, and selecting the data files based on the determined file type. The described methods may further compare the determined file type to a set of preselected types, which are preselected based on the likelihood that the encryption status of the file type is known, and further select data files for calculating the frequency of occurrence if they have a file type different than the preselected types. In some described examples, the method may also calculate a measure of compressibility of the data file, and compare the measured compressibility against the threshold value. The described methods may also select data files from the data source for calculating the measure of compressibility by determining the file types of the data files on the data source, and selecting files based on the determined file type. In some described examples, the method may compare the determined file types to a set of preselected types, which are preselected based on the likelihood the compression status of the file type is known, and further select data files for calculating the compressibility if they have a file type different than the preselected types.

The present disclosure also generally relates to computer systems with at least one data source and a data processor configured to perform a procedure to detect encryption status of a data file and selectively encrypting the data file based on the encryption status of the data file. The described computer systems may be arranged to read the data file from a data source, calculate a value of a property of the data file, compare the calculated value with a threshold value to determine whether the data file is encrypted, and may encrypt those data files that are determined as being unencrypted.

In some further described systems, the procedure may include, calculating, as the calculated value for a property of the read data files, a frequencies of occurrence of a plurality of values in the data files, measuring the uniformity of the calculated frequencies, and comparing the calculated uniformity measure to a threshold value. In some described examples, the computer system may calculate a distribution of the frequencies of occurrence of a plurality of values in the read data file, and compare the distribution with the distribution of the frequencies of occurrence to an average distribution for at least one reference distribution, and make a determination whether the distribution of the frequencies of occurrence differs significantly from the at least one reference distribution. The described system may further use as a reference distribution the distribution of frequencies of a predetermined file type. In some described examples, data files on which the frequency of occurrence is calculated may be selected from the data source by determining the file types of the data files on the data source, and selecting the data files based on the determined file type. The described system may further compare the determined file type to a set of preselected types, which are preselected based on the likelihood that the encryption status of the file type is known, and further select data files for calculating the frequency of occurrence if they have a file type different than the preselected types. In some described examples, the system may also calculate a measure of compressibility of the data file, and compare the measured compressibility against the threshold value.

The present disclosure also generally relates to computer-accessible mediums having stored thereon computer-executable instructions for detecting encryption status of a data file and selectively encrypting the data file based on the encryption status of the data file. The described instructions may include reading the data file from a data source, calculating a value of a property of the data file, comparing the calculated value with a threshold value to determine whether the data file is encrypted, and encrypting those data files that are determined as being unencrypted.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect an encryption status of a data file stored in a data source and to selectively encrypt the data file based on the encryption status, the method comprising:
   reading the data file from the data source;
   comparing a data file type of the data file to a set of data file types, wherein the data file types are included in the set according to a likelihood that the encryption status is known;
   in response to a determination that the encryption status of the data file type of the data file is unknown, calculating a value of a property of the data file read from the data source, including calculating a distribution of frequencies of occurrence of a plurality of values in the data file read from the data source;
   comparing the calculated value with a threshold value to determine whether the data file read from the data source is encrypted or unencrypted, including comparing the distribution of frequencies of occurrence of the plurality of values in the data file to an average distribution of frequencies for a known reference distribution to determine whether the distribution of frequencies of occurrence of the plurality of values in the data file differs significantly from the average distribution of frequencies for the known reference distribution, wherein the known reference distribution is associated with a text file type;
   in response to determining that the data file read from the data source is unencrypted as a result of the comparing, encrypting the data file read from the data source and storing the encrypted data file in a cache; and
   in response to determining that the data file read from the data source is encrypted as a result of the comparing, storing the data file read from the data source in the cache without further encryption.

2. The method of claim 1, further comprising determining a measured uniformity by measuring uniformity of the calculated frequencies of occurrence; and
   wherein comparing the calculated value with the threshold value comprises comparing the measured uniformity to the threshold value.

3. The method of claim 2, further comprising calculating a Shannon entropy of the frequencies of occurrence, wherein the measured uniformity is measured by the Shannon entropy.

4. The method of claim 3, wherein the Shannon entropy is defined as:

$$H(X) = -\sum_{i=1}^{n} p(x_i) \log_b p(x_i);$$

where H(X) is the Shannon entropy and p is a probability mass function of data with values ranging between $x_1$ and $x_i$.

5. The method of claim 4, wherein the Shannon entropy is a value having a unit in bits.

6. The method of claim 5, wherein b is set at 2.

7. The method of claim 1, wherein reading the data file from the data source comprises:
   determining file types of a plurality of data files within the data source;
   selecting the data file from the plurality of data files within the data source based on the determined file types; and
   reading the selected data file from the data source.

8. The method of claim 7, wherein calculating the value of the property of the data file read from the data source comprises calculating a measure of compressibility of the data file read from the data source; comparing the calculated value with the threshold value comprises comparing the calculated measure of compressibility to a threshold compressibility value.

9. The method of claim 1, wherein
calculating the value of the property of the data file read from the data source comprises calculating a measure of compressibility of the data file read from the data source; and
comparing the calculated value with the threshold value comprises comparing the calculated measure of compressibility to a threshold compressibility value.

10. The method of claim 7, wherein calculating the value of the property of the data file read from the data source comprises calculating a measure of compressibility of the data file read from the data source; comparing the calculated value with the threshold value comprises comparing the calculated measure of compressibility to a threshold compressibility value.

11. A computing system arranged to detect an encryption status of a data file and selectively encrypt the data file based on the encryption status, the computing system comprising:
a data source including the data file stored therein on a non-transitory computer-readable medium; and
a data processor implemented in hardware and configured to:
read the data file from the data source into system memory;
calculate a value of a property of the read data file, by calculation of a distribution of frequencies of occurrence of a plurality of data values in the data file read from the data source;
compare the calculated value with a threshold value to determine whether the read data file is encrypted or unencrypted, by comparison of the distribution of frequencies of occurrence of the plurality of data values in the data file to an average distribution of frequencies for a known reference distribution to determine whether the distribution of frequencies of occurrence of the plurality of data values differs significantly from the average distribution of frequencies for the known reference distribution;
in response to a determination that the read data file is unencrypted based on the comparison of the calculated value with the threshold value:
determine a type of the data file;
compare the type of the data file to a table of file extensions indicating compressed files, wherein the table of file extensions includes a .rar file extension;
in response to the type of the data file being a match to a file extension in the table of file extensions, determine that the data file is encrypted;
in response to the type of the data file not being a match to file extensions in the table of file extensions, run a compression routine on the data file to generate a compressed data file;
compare a size of the data file to a size of the compressed data file;
based on the comparison of the size of the data file to the size of the compressed data file, determine whether the data file is compressible;
in response to a determination that the data file is compressible, determine that the data file is unencrypted;
in response to a determination that the data file is not compressible, determine that the data file is encrypted;
in response to a determination that the read data file is unencrypted based on the comparison of the calculated value with the threshold value and the comparison of the size of the data file to the size of the compressed data file, encrypt the read data file and store the encrypted data file in a cache; and
in response to a determination that the read data file is encrypted based on the comparison of the calculated value with the threshold value, the comparison of the type of the data file to the table of file extensions, or the comparison of the size of the data file to the size of the compressed data file, store the read data file in the cache without further encryption.

12. The computing system of claim 11, wherein
to calculate the value of the property of the read data file, the data processor is configured to:
calculate frequencies of occurrence of the plurality of values in the data file read from the data source, and
measure uniformity of the calculated frequencies of occurrence; and
to compare the calculated value with the threshold value, the data processor is configured to:
compare the measured uniformity against the threshold value.

13. The computing system of claim 11, wherein the known reference distribution is associated with a particular file type.

14. The computing system of claim 11,
wherein to read the data file from the data source, the data processor is configured to:
determine file types of a plurality of data files within the data source, and
select a subset of data files from the plurality of data files based on the determined file types;
wherein to calculate the value of the property of the read data file, the data processor is configured to calculate the values of the properties for each of the data files from the subset of data files; and
wherein to compare the calculated value with the threshold value, the data processor is configured to compare the calculated values of the properties for each of the data files from the subset of data files to the threshold value to determine whether each retrieved read data file is encrypted or unencrypted.

15. The computing system of claim 14, wherein to select the subset of data files from the plurality of data files based on the determined file types, the data processor is configured to
compare the determined file types of the plurality of data files to a set of preselected file types, wherein the set of preselected file types are chosen according to a likelihood that the encryption status of the file type is known; and
select the subset of data files from the plurality of data files having file types different than the set of preselected file types.

16. The computing system of claim 13 wherein the known reference distribution is associated with a text file.

17. A non-transitory computer accessible medium that includes computer executable instructions stored thereon to detect an encryption status of a data file stored in a data source and to selectively encrypt the data file based on the encryption status, when the computer executable instructions are executed by a processing unit the processing unit is configured to perform a procedure comprising:
reading the data file from the data source;
calculating a value of a property of the data file read from the data source;
comparing the calculated value with a threshold value to determine whether the data file read from the data source is encrypted or unencrypted, including comparing a distribution of frequencies of occurrence of the value of the property in the data file to an average distribution of frequencies for a known reference distribution, wherein the known reference distribution includes a distribution of frequencies of a text file;

in response to determining that the data file read from the data source is unencrypted as stored in the data source as a result of the comparing, encrypting the data file read from the data source and storing the encrypted data file in a cache; and in response to determining that the data file read from the data source is encrypted as stored in the data source as a result of the comparing, storing the data file read from the data source in the cache without further encryption.

18. The computer accessible medium of claim 17, wherein calculating the value of the property of the data file read from the data source comprises calculating frequencies of occurrence of a plurality of values in the data file read from the data source, and determining a measured uniformity by measuring uniformity of the calculated frequencies of occurrence; and wherein comparing the calculated value with the threshold value comprises comparing the measured uniformity to the threshold value.

19. The computer accessible medium of claim 17, wherein calculating the value of the property of the data file read from the data source comprises calculating a measure of compressibility of the data file read from the data source; and wherein comparing the calculated value with the threshold value comprises comparing the calculated measure of compressibility to a threshold compressibility value.

20. The method of claim 1, wherein reading the data file from the data source includes reading the data file from the cache.

21. The computing system of claim 11, wherein the data source including the data file stored therein is stored in the cache.

22. The non-transitory computer accessible medium of claim 17, wherein reading the data file from the data source includes reading the data file from the cache.

23. The method of claim 8, wherein the set of preselected file types is a table of preselected file types including a .rar file type.

24. The system of claim 12, wherein the data processor is configured to calculate a Shannon entropy of the frequencies of occurrence, wherein the measured uniformity is measured by the Shannon entropy and wherein the Shannon entropy is defined as:

$$H(X) = -\sum_{i=1}^{n} p(x_i)\log_b p(x_i);$$

where H(X) is the Shannon entropy and p is a probability mass function of data with values ranging between $x_1$ and $x_i$.

25. The computer accessible medium of claim 18, wherein comparing the measured uniformity to the threshold value comprises comparing the distribution of frequencies of occurrence of the plurality of values in the data file to an average distribution of frequencies for the known reference distribution.

26. The computer accessible medium of claim 19, wherein calculating the measure of compressibility of the data file read from the data source comprises comparing a type of the data file read from the data source with file extensions contained in a table of file extensions including a .rar file extension.

* * * * *

UNITED STATES PATENT AND TRADEMARK OFFICE
CERTIFICATE OF CORRECTION

PATENT NO. : 8,799,671 B2  
APPLICATION NO. : 12/436644  
DATED : August 5, 2014  
INVENTOR(S) : Conte et al.

Page 1 of 2

It is certified that error appears in the above-identified patent and that said Letters Patent is hereby corrected as shown below:

In The Drawings

Sheet 2 of 8, Fig. 2, delete "  " and insert --  --, therefor.

In The Specification

In Column 1, Line 48, delete "is an flowchart" and insert -- is a flowchart --, therefor.

In Column 1, Line 62, delete "a illustrative" and insert -- an illustrative --, therefor.

In Column 2, Line 38, delete "a encryption" and insert -- an encryption --, therefor.

In Column 3, Lines 6-7, delete "read only memory (ROM) 120," and insert -- read only memory (ROM) 122, --, therefor.

In Column 4, Line 1, delete "is an flowchart" and insert -- is a flowchart --, therefor.

In Column 4, Line 54, delete "Whether" and insert -- whether --, therefor.

Signed and Sealed this  
Twenty-seventh Day of January, 2015

Michelle K. Lee  
*Deputy Director of the United States Patent and Trademark Office*

CERTIFICATE OF CORRECTION (continued)
U.S. Pat. No. 8,799,671 B2

In Column 5, Line 32, delete "zip" and insert -- .zip --, therefor.

In Column 6, Line 21, delete "a illustrative" and insert -- an illustrative --, therefor.

In Column 7, Line 48, delete "a unencrypted" and insert -- an unencrypted --, therefor.

In Column 9, Line 64, delete "and or" and insert -- and/or --, therefor.

In The Claims

In Column 14, Line 50, in Claim 16, delete "claim 13" and insert -- claim 13, --, therefor.